(No Model.) 6 Sheets—Sheet 1.
D. C. WAY.
TYPE WRITING MACHINE.

No. 460,901. Patented Oct. 6, 1891.

WITNESSES:
Fred G. Dieterich
Edw. W. Byrn

INVENTOR:
Daniel C. Way.
BY Munn & Co
ATTORNEYS

(No Model.) 6 Sheets—Sheet 5.

D. C. WAY.
TYPE WRITING MACHINE.

No. 460,901. Patented Oct. 6, 1891.

WITNESSES:
Fred G. Dieterich
Edw. W. Byrn

INVENTOR:
Daniel C. Way
BY Munn & Co
ATTORNEYS (No Model.) 6 Sheets—Sheet 6.

D. C. WAY.
TYPE WRITING MACHINE.

No. 460,901. Patented Oct. 6, 1891.

WITNESSES:
Fred G. Dieterich
Edw. W. Byrn

INVENTOR:
Daniel C. Way.
BY Munn & Co.
ATTORNEYS

UNITED STATES PATENT OFFICE.

DANIEL C. WAY, OF ORD, NEBRASKA.

TYPE-WRITING MACHINE.

SPECIFICATION forming part of Letters Patent No. 460,901, dated October 6, 1891.

Application filed December 30, 1890. Serial No. 376,305. (No model.)

*To all whom it may concern:*

Be it known that I, DANIEL C. WAY, of Ord, in the county of Valley and State of Nebraska, have invented a new and useful Improvement in Type-Writing Machines, of which the following is a specification.

The object of my invention is to provide a new form of type-writer which shall be capable of writing upon the pages of a book, as well as upon a detached sheet of paper, and in which also the type-wheel moves across the paper and leaves the line of printed matter in plain view of the operator as fast as it is printed.

To these ends my invention consists in the peculiar construction and arrangement of parts, which I will first proceed to fully describe, with reference to the drawings, and then point out in the claims.

Fig. 4 is an end elevation of the type-writer, from the end next to the operator, showing, also, the book in position and showing in section the devices for holding the book. Fig. 5$^a$ is a detail of this view. Fig. 6 is a similar section to Fig. 5, taken through line $yy$.

In the drawings, Figs. 1, 2, 3, and 4, A represents the table upon which the printing is done. This table is a flat stiff sheet of metal or other suitable material, supported at its four corners upon legs about three inches long. At one end of the table there is journaled in bearings a rock-shaft A', which at its extremities is provided with upwardly-extending arms $A^2 A^2$, to which are attached parallel guide-bars $A^3 A^3$, one on each side of the table a short distance above the level of the same. These guide-bars at the end next to the operator are connected by a transverse rod $A^4$, and these parallel guide-bars $A^3$ and rod $A^4$ form a rectangular frame, which carries the entire type-writer frame X and its working parts. This type-writer frame is merely a rectangular box-shaped frame provided upon each side with two guide-eyes $A^5 A^5$, which slide over the guide-bars to and from the operator. The rectangular supporting-frame $A^3 A^4$ may be raised with the type-writer to apply the book or sheet of paper to the table or remove it therefrom by raising it bodily, as shown in dotted lines in Fig. 1, the rock-shaft A' serving as a pivotal axis for this purpose. When the supporting-frame is in horizontal position, its rod $A^4$ rests in seats or notches at the top of the front legs of the machine, and spring-catches $A^9$ lock over the top of the rod to hold it down firmly to place. When the writing or printing is to be done upon a detached sheet of paper this is clamped upon the top of the table by any suitable clasps; but when the page of a book is to be printed upon one-half of the open book is tightly held to the lower side of the table, and the leaf of the book is extended over the top of the table, as in Fig. 4. To hold the book in place, one or more stiff bars $A^6$ are provided, with straps $A^7$ at their ends, (see Fig. 2,) which bars are placed beneath the book and the book held up by the straps, which are drawn up and tightly secured to the table by means of a clamp or locking device $A^8$ or by a buckle or other suitable means.

I will now proceed to describe the operative parts of the type-writer, and especially that portion by which the operation of the keys is made to effect the depression of the type, and first of all it will be necessary to describe the construction and arrangement of the type-wheel.

Figure 9:
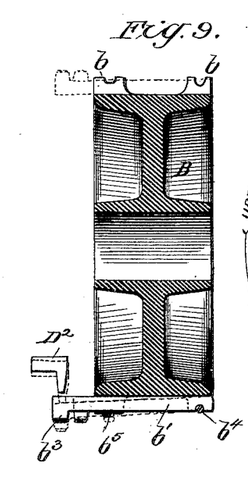
Fig. 9 is a central vertical section of the type-wheel.
Figure 10:
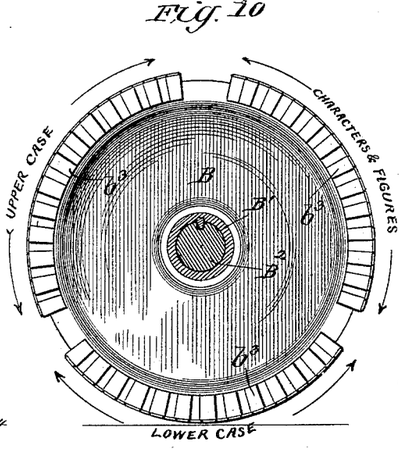
Fig. 10 is a side and Fig. 11 an edge view of the same.
Figure 11:
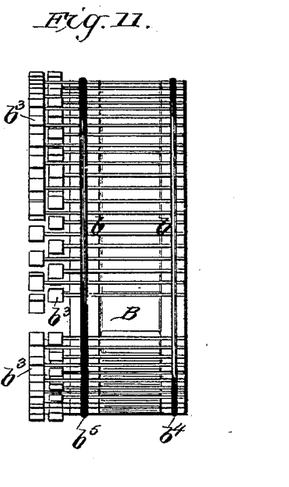

B, Figs. 9, 10, and 11, is the type-wheel, which is preferably about one and a half inches in diameter, but may be made larger or smaller. It is in the nature of a light pulley or wheel made of hard rubber or other suitable material and formed with two grooved circumferential flanges $b\ b$, with a space between them. The type consists of straight metal bars $b'$, Fig. 15, about an inch long, with a slot $b^2$ in one edge near one end and with a hard-rubber type-block $b^3$ vulcanized upon the other end. This end of the type-bar is notched or cut away in V shape, so as to give a better hold for the attachment of the vulcanized block thereto. These type-blocks may be made of steel and in one piece with the shank; but for lightness and convenience in repairing I prefer to make the type-blocks of hard rubber and unite them to the metal shanks by vulcanizing them upon the same, as described. Across the periphery of the type-wheel, parallel to the axis, are sawed a series of parallel slits, which form seats for the shanks of the type, which are arranged close together around the entire periphery of the wheel. The flanges $b\ b$ of the wheel are also grooved down the center, and in one groove is wrapped around the wheel a retaining-wire $b^4$, which also enters the slots $b^2$ of the type-shanks and forms a pivotal axis for the same. In the groove of the other flange $b$ is arranged an elastic band $b^5$, which holds the type-shanks paralled to the axis of the wheel with the type blocks or heads projecting laterally away from the wheel. With this construction it will be seen that any one of the type-blocks may be thrown farther away from the circle of the others and be immediately returned, the wire serving as a retainer or pivotal axis and the elastic band permitting this yielding motion. With this construction of shank, having a lateral open slot $b^2$, it will be seen that this not only permits the type to be cheaply cast, but it permits any one of the type-shanks to be removed from the type-wheel without disturbing the others. These type are intended to be depressed to contact with the paper below by a tappet-arm operating from the inside of the circle of type, as shown at $D^2$ and hereinafter described. The periphery of the type-wheel is laid off in three (see Fig. 10) segments or sections for upper case, lower case, and figures and characters, and these segments or sections of the wheel are brought into range of co-operation with the keys by adjusting devices hereinafter described.

For the present it will be sufficient to state that the depression of the keys gives an amplitude of swing or range of oscillation to the type-wheel equal to one of the subdivisions of the wheel only, and each particular key when depressed is so arranged as to throw its corresponding letter of the type-wheel to the lowest point nearest the table and force said letter into printing contact with the paper.

I will now describe how the foregoing result is effected.

The type-wheel is rigidly attached to a metal hub $B'$, and this latter is made to slide upon a rock-shaft $B^2$ across the table, the type-wheel and rock-shaft being connected together by a feather and groove, which causes them to rotate together, or the rock-shaft may be made square or angular for the same purpose. $C\ C'$ are the key-levers. (See Figs. 3, 5, and 6.) These are connected to a cross-bar $X'$ of the type-writer frame by means of springs $C^2$, which hold the key-levers in elevated position, but allow them to be depressed. The key-levers may, however, be pivoted, if desired. These springs are connected to the frame-bar by two set-screws $c$ and $c'$, one set of which enters the cross-bar from the top and clamps the springs to the frame, and the other set of which passes through the bent ends of the springs and enters the frame-bar from the side and serves to adjust the key-levers, as hereinafter described. One set of key-levers $C$, Fig. 5, has inclines or cams $c^2$ facing in one direction, and the other set of key-levers $C'$, Fig. 6, has inclines or cams $c^3$ facing in the opposite direction, and the incline of each key-lever has a different throw from all the others or imparts a different extent or range of movement by reason of its different inclination. It is the extent and direction of the throw of these inclines operating upon a rocking frame and through a connecting-rod that determines the extent and direction of oscillation of the type-wheel necessary to bring each particular letter into position for printing. The frame that the type-levers act upon is composed of a rock-shaft $C^{12}$, journaled at the bottom of the frame X, Figs. 3, 5, and 6. This rock-shaft has a series of rigid arms $C^3$, carrying at their tops freely-revolving rollers $C^9$, which are acted upon by the inclines or cams of the key-levers. This frame is held vertical by an arm $C^4$, Figs. 3 and 6, extending up from the rock-shaft at one end and provided with a pin $c^4$, that lies between two vertical springs $C^5\ C^5$, so that no matter which way the rocking frame is deflected it will be returned to the vertical by one or the other of the springs $C^5$. At the opposite end of the rocking frame is another vertical arm $C^6$, (see Figs. 5 and 3,) which at its upper end is jointed to a horizontal connecting-rod $C^7$, which extends to and imparts oscillating motion to the type-wheel shaft $B^2$. The connection between this rock-shaft $B^2$ and connecting-rod is made by two links $l\ l$, pivoted at one end to the connecting-rod, crossed, and then pivoted at their lower ends to a plate $C^8$ on the shaft $B^2$. The object of this connection is to cause a given movement of the connecting-rod to impart an equal throw and speed to the plate $C^8$ and shaft $B^2$ throughout all parts of the stroke of said connecting-rod. These cross-links accomplish this by causing the links to be compensating in effect. Thus in the movement of the connecting-rod as one link turns toward a vertical position and decreases in leverage on the plate the other turns toward a horizontal and increases in leverage on the plate, as shown in dotted lines in Fig. 5ª. This is important on account of the equal spacing of the type on the wheel and the consequent necessity of having the connecting-rod impart an equal throw to the plate, shaft, and type-wheel throughout all parts of the travel of the connecting-rod, in order to secure the proper registration of the letters, or, rather, the bringing of each particular letter to its proper position for printing. Now it will be seen that one set of type-levers C have inclines $c^2$, that throw the rollers $C^9$, connecting rod $C^7$ and type-wheel, in one direction, while the other set of levers C' have inclines $c^3$, that throw these same devices in the opposite direction, and by having the segment of type on the type-wheel with its middle type normally nearest the table (see Fig. 10) it will be seen that one set of type-levers C will swing the type-wheel in one direction through the range of the letters on one side of the middle line, and the other set of type-levers C' will throw the type-wheel in the other direction through the range of letters on the other side of the middle line, and, as the incline or cam of each type-lever has a range of throw different from all the rest, each lever will throw the type-wheel in the direction and to the extent that its particular letter happens to be on one side or the other of the middle type, or type which rests normally in closest position to the table. If the cams become worn so as to fail to make the proper throw, the key-levers may be adjusted so as to bring the cams closer to the rollers by loosening the two sets of set-screws $c$ $c'$ and adjusting the type-levers, as may be required.

Figure 1:
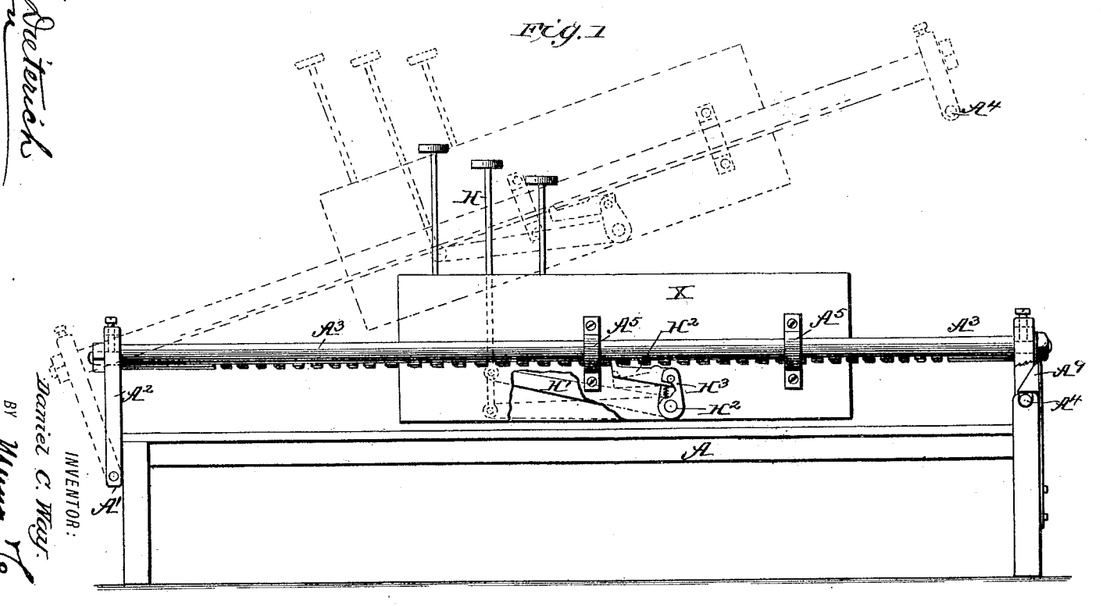
Figure 1 is a side view of the type-writer, showing in dotted lines the raised position of the printing devices.
Figure 2:
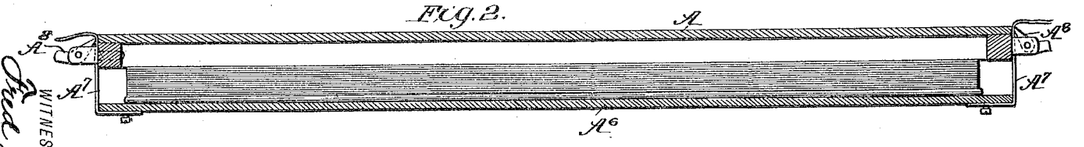
Fig. 2 is a sectional view of the type-writer table, showing the application of the book to the lower side of the same and the devices for holding the book in place.
Figure 3:
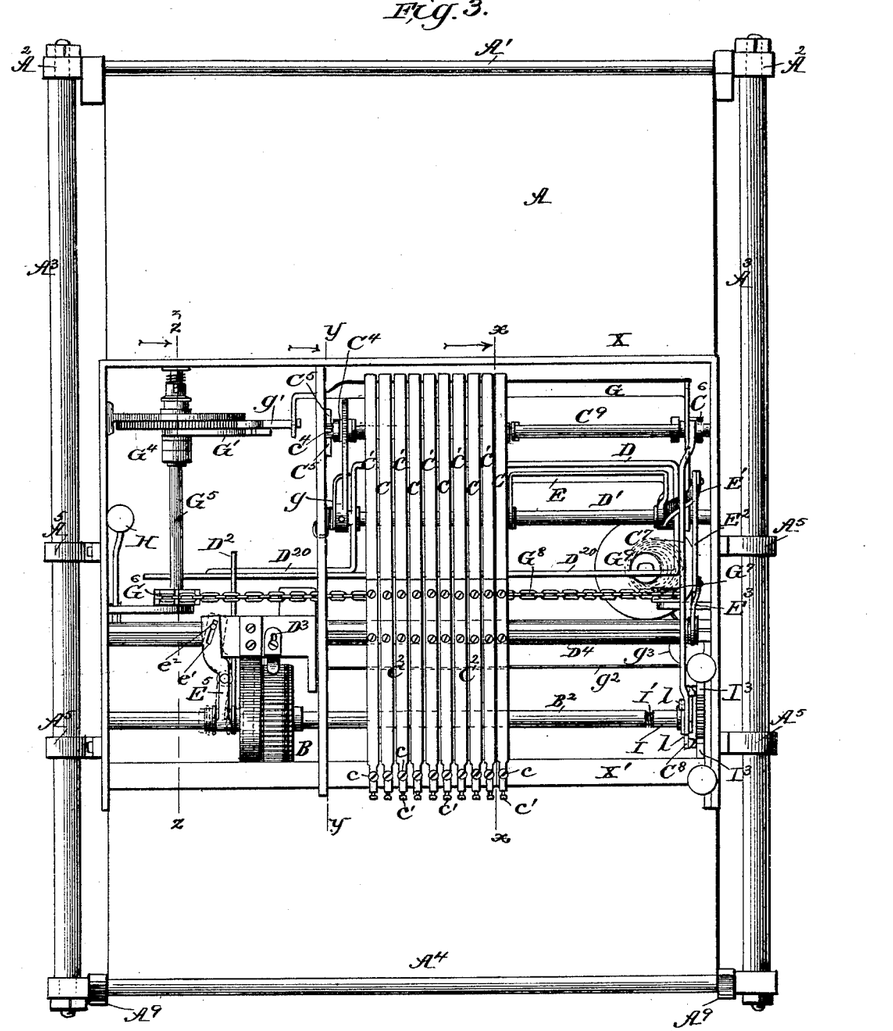
Fig. 3 is a plan view of the working parts of the type-writer.
Figure 5:
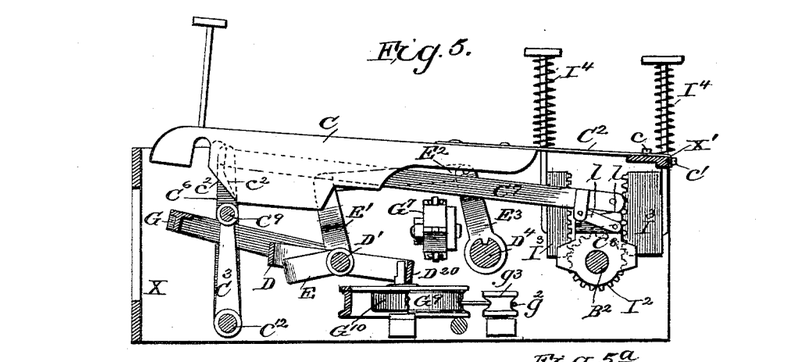
Fig. 5 is a vertical section taken through line $xx$ of Fig. 3, looking in the direction of the arrow.
Figures 12, 15:
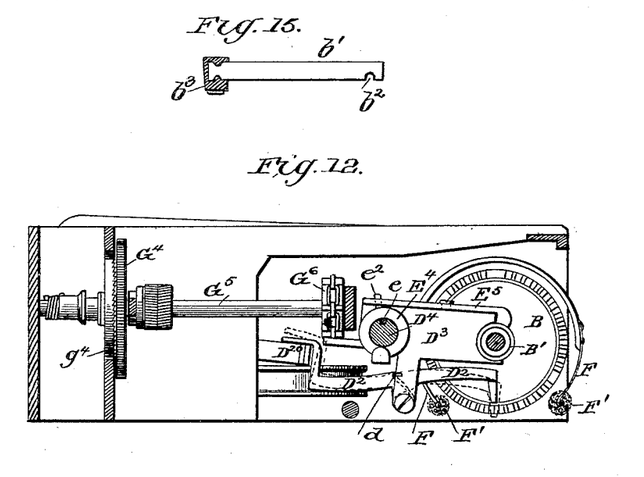
Fig. 12 is a vertical section taken through line $zz$ of Fig. 3.
Fig. 15 is a sectional detail of the type.
Figure 16:
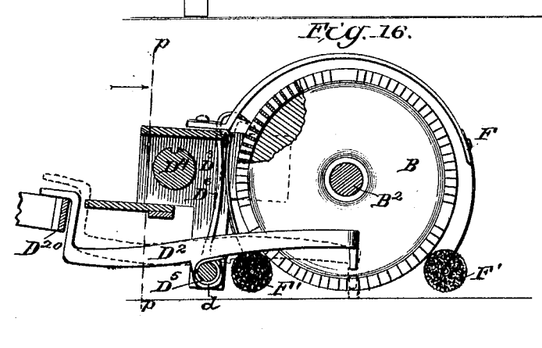
Fig. 16 is a side view of the type-wheel with its connections.
Figure 17:
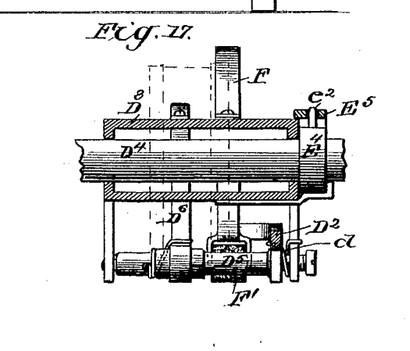
Fig. 17 is a section through line $pp$ of Fig. 16.

Immediately following the throwing of the type-wheel in position the type is to be depressed for printing contact. For this purpose a horizontal bail D, Figs. 3 and 5, is hung upon a horizontal shaft D', fixed in the main frame X, and this bail is held up beneath the key-levers, so that the last part of the descent of the key-levers will depress this bail. On the opposite side of the axial shaft from the bail is a long lift-bar $D^{20}$, Fig. 3, which rests beneath one end of a tappet-lever $D^2$, Fig. 12, the opposite end of this tappet-lever being bent inside the circle of type of the type-wheel and turned down in the form of a tooth or die, which is adapted to strike the type-block and force it down into printing contact with the paper whenever the rear end of this tappet-lever is forcibly lifted by the bar $D^{20}$ from the action of the key-lever on the bail. This tappet-lever is fulcrumed in a frame or carriage $D^3$, Figs. 3 and 12, which slides on a rock-shaft $D^4$, journaled in the main frame, and the tappet-lever is held by a spring $d$ with its rear end down and the end in the type-wheel up. The tappet-lever, Figs. 12, 16, and 17, is connected to a rock-shaft $D^5$, which forms its fulcrum, and this rock-shaft is provided with an upwardly-extending arm $D^6$, which has a tooth at its upper end that forms a detent engaging with the type-shanks of the type-wheel, which latter act as teeth for the detent. The object of this detent is to hold the type-wheel firmly while the tappet-lever is depressing the type, and when the tappet-lever is deflected for this purpose the same movement serves, by rocking the shaft $D^5$, to throw the detent into engagement with the type-wheel, as shown in dotted lines, Fig. 16.

In placing the type upon the type-wheel, in order to reduce the circumference of the wheel the type-blocks are placed in two rows, one projecting farther away from the plane of the type-wheel than the other. (See Fig. 11.) This is an important construction of the type-wheel, for as there are three different sets of printing-blocks (upper case, lower case, and characters and figures) a single row of these would make a circumference so large that the throw of the wheel would be so embarrassed by so much inertia in starting and so much momentum in stopping that the wheel would soon get out of adjustment and fail to register properly. By the double row of type on alternately long and short shanks I not only reduce the diameter of the wheel and get rid of the objectionable inertia and momentum, but the shanks of the type are brought closer together and form teeth for the engagement of the detent to lock the type-wheel stationary during the printing interval, as hereinbefore described.

When type inside of the farthest projecting row are to be depressed, the type-wheel must be shifted laterally in an automatic manner to make the impression in the proper place. For this purpose one-half of the key-levers are made to act upon a shifting mechanism for the type-wheel, which shifting mechanism consist of the following parts: Figs. 3 and 5, E is a bail placed beneath one-half of the key-levers and hung upon the same shaft as the type-operating bail. The bail E is provided at one end with an upwardly-extending arm E', which is connected by a link-bar $E^2$ with an arm $E^3$ on the shaft $D^4$, which carries the type-wheel carriage $D^3$. This shaft $D^4$ is a rock-shaft and is grooved longitudinally to receive a pin $e$, Fig. 12, which projects inwardly from a collar $E^4$, that slides along the shaft with the carriage $D^3$. This shaft may be made square for the same purpose. As the shaft rocks it turns this collar $E^4$, and from this there projects outwardly a pin $e^2$, Figs. 3 and 12, which plays in an oblique slot $e'$ of a lever $E^5$, having a vertical axis for a fulcrum and having its opposite end resting in a groove formed in a projecting hub of the type-wheel. By this mechanism it will be seen that when one-half of the key-levers is depressed they serve to rock the shaft $D^4$ through bail E and the connecting rod and arms, and the pin $e^2$, moving with the rock-shaft, swings the lever $E^5$ laterally, and this carries with it the type-wheel a distance sufficient to bring the other row of type into printing position, as shown by dotted line, Fig. 3.

To the type-wheel carriage $D^3$ there are attached spring-arms F F, Fig. 12, bearing inking-rollers $F'$ $F'$, which ink the type of the type-wheel continually as the latter is oscillated.

I will now describe the mechanism by which the movement of each type-lever is made to feed the type-wheel laterally the proper distance for spacing the letters on the line.

Figures 5A, 6:
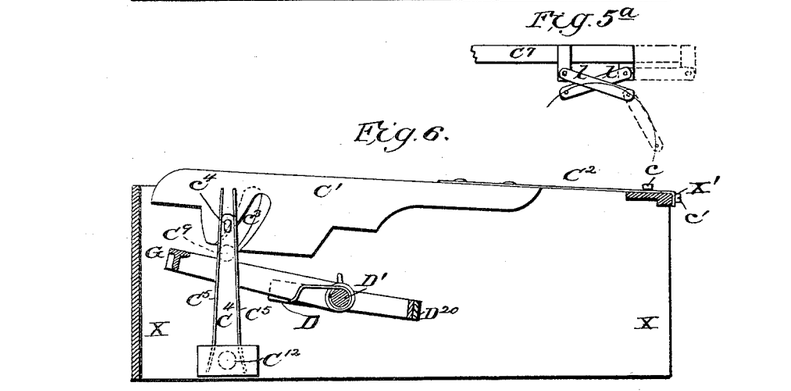
Figure 7:
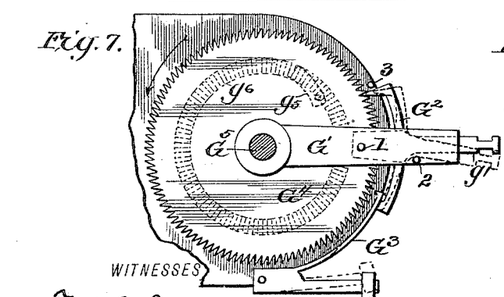
Fig. 7 is a side view, and Fig. 8 a sectional view, of the devices for operating the feed-chain.
Figure 8:
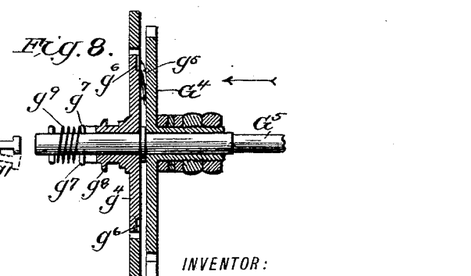

G, Figs. 3, 5, and 6, is a bail running under all the type-levers near their ends and pivoted or hung upon the shaft $D'$. This bail is normally held up by one or more springs $g$, Fig. 3, which may be coiled about the shaft, as shown, or be otherwise applied. From this bail there projects at one end a forked extension which embraces the outer end of a pawl-arm $g'$, Figs. 3 and 7. This pawl-arm is pivoted at 1 to a swinging arm $G'$ and bears a circular pawl $G^2$, whose range of movement is limited by a pin 2 in the downward direction and a pin 3 in upward direction. Beneath the pawl is a detent $G^3$, whose tooth is overlapped by the pawl, and which detent is forced into the teeth of a ratchet-wheel $G^4$ to hold it stationary while the pawl is moving back to a new position by the rocking of the pawl-arm upon its pivot 1. The oscillation of the pawl by the bail causes a step-by-step motion to be imparted to the ratchet-wheel $G^4$, and thence to a short shaft $G^5$, which has a chain-wheel $G^6$ upon one end. Around this chain-wheel $G^6$ and another one $G^7$ at the opposite side of the machine there passes an endless chain $G^8$, which is attached to the carriage of the type-wheel and serves when moved by the devices just described to give a step-by-step motion to the type-wheel across the page. To cause the type-wheel to move freely, quickly, and positively, it is drawn along in the direction of its feed by a tension strap or cord $g^2$, which passes around a guide-pulley $g^3$ and is wound upon a take-up drum $G^9$, which has a coil-spring $G^{10}$ within the same. In order to permit the type-wheel to be moved back after completing a line of printing, there is a slip connection between the ratchet-wheel $G^4$ and the shaft $G^5$—that is to say, the ratchet-wheel is loose on the shaft (see Figs. 7 and 8) and is geared to it for the advance movement by a wheel $g^4$, secured to the shaft, and a spring-pawl $g^5$ on the ratchet-wheel, which engages teeth $g^6$ on the side of the tight wheel. This wheel $g^4$ may be locked to the shaft by pins $g^7$ entering slots in a hub $g^8$, a spring $g^9$ allowing wheels $g^4$ to pass pawl $g^5$ when moved backward. This permits all the parts to turn together for the advance feed, but allows the type-wheel, carriage, chain, and shaft $G^5$ to be freely run backward.

I will now proceed to describe how the type-writer frame is moved bodily down the page to start a new line of printing after one line has been completed. This is done by the operator at will through a key H, Fig. 1. The lower end of this key is jointed to an arm $H'$ on a rock-shaft $H^2$, which is journaled in the side frame X of the type-writer just below the level of the guide-bars $A^3$, upon which the type-writer slides. The bottom sides of these guide-bars are notched to form teeth, and with them there engage on each side of the machine spring-pawls $H^2$, pivoted on short arms $H^3$ of the rock-shaft. By this construction the depression of the key H is made to rock the shaft, and the pawls $H^2$ engage with the teeth of the guide-bars and produce a downward thrust on the type-writer frame that adjusts it to a lower position on the page. These parts are so constructed that when the key H is forced down to the limit of its stroke it throws the pawls entirely out of engagement with the teeth of the guide-bars, as shown in dotted lines, thus permitting the type-writer to be moved to the top of the page again when necessary.

I will now describe the means whereby the type-wheel may be shifted in position about its axis to bring the segments of the wheel bearing the different classes of type (such as upper or lower case or figures and characters) into operative position.

Figure 13:
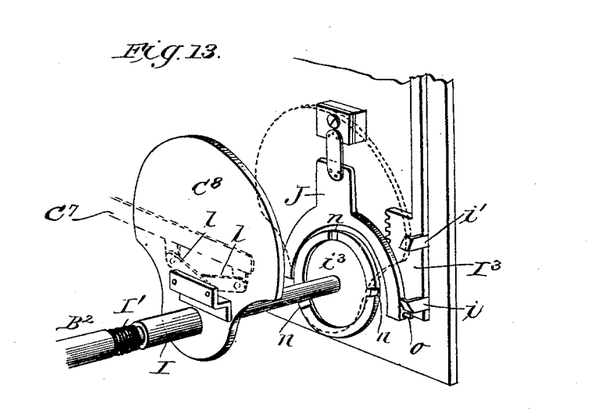
Fig. 13 is a perspective view illustrating the shifting mechanism for the type-wheel.
Figure 14:
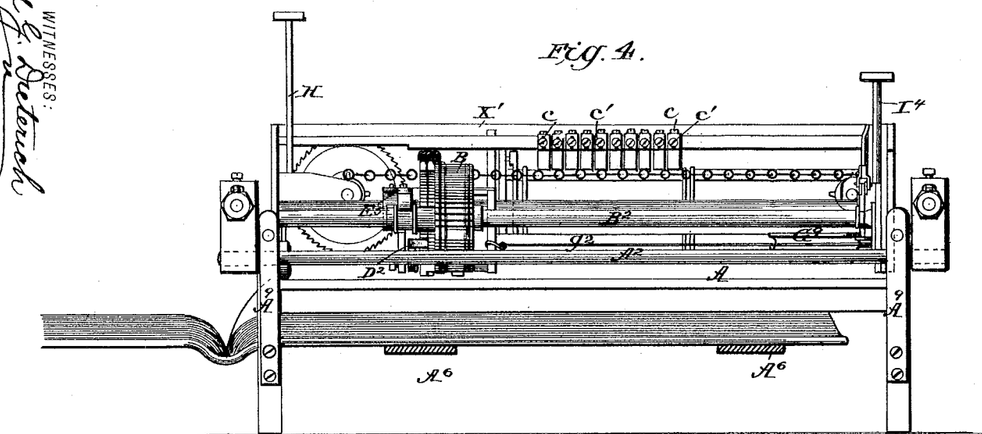
Fig. 14 is a perspective view showing the stop mechanism for determining the throw of the type-wheel.

The wheel is preferably divided into three segments, one for upper case, another for lower case, and another for figures and characters, as in Fig. 10. Ordinarily the wheel is adjusted with the segment bearing the lower-case letters downward, and its other two segments on the upper portion and opposite sides of the wheel. The type-wheel shaft $B^2$ is reduced at one end in diameter, Figs. 13 and 14, and provided with a loose sleeve I, which is attached to the plate $C^8$, to which are pivoted the crossed links $l$ $l$, that oscillate the type-wheel shaft. This plate $C^8$ is normally locked to the type-wheel shaft, but may be made to yield with sleeve I against a spring $I'$ to open a clutch when it is desired to turn the shaft a third of a revolution to bring a new series of type into play. This is accomplished as follows: On the reduced end of the type-wheel shaft is rigidly fixed a small toothed wheel $I^2$, and upon opposite sides of the same (see Figs. 5 and 13) are vertically-sliding racks $I^3$ $I^3$, which have vertically-projecting stems terminating in keys, and which keys and racks are normally held up by spiral springs $I^4$. When either of these racks is depressed, it turns the wheel $I^2$ a third of a revolution, and consequently turns the type-wheel shaft and type-wheel a third of a revolution, bringing a new series of type into range of action. One of these rack-bars turns the wheel one way and the other the other way. Beside the rack-bars $I^3$ and straddling the type-wheel shaft is a fork J, which is suspended from a stationary point of the frame above and is capable at its lower end of lateral deflection. On one side of the wheel I² is framed a clutch-face $i^3$, with three notches $n$ dividing the circle of its face into three equal parts. Into one of these notches a lug $n'$ on the plate C⁸, Fig. 14, engages to cause the oscillation of levers $l$, plate C⁸, and sleeve to be transmitted to the shaft bearing the type-wheel. As shown in Fig. 13, plate C⁸ is drawn away from clutch $i^3$ to show the latter. When one of the shifting keys is, however, forced down, fork J moves plate C⁸ sidewise, and the lug $n'$ is forced out of one of the notches, the toothed wheel turned a third of a revolution, and the lug $n'$ allowed to enter another notch, which, while it shifts the position of the type-wheel one-third of a revolution, again locks the clutch, so that the operations of the type-levers are transmitted to the type-wheel. This is accomplished by two inclines $i$ and $i'$, Fig. 13, on each sliding rack, which, operating upon the pins $o$ of a swinging fork J, throw it laterally against plate C⁸, bearing the lug $n'$, and forces the same with its sleeve away from the clutch-face of the toothed wheel, the spiral spring I' serving, when the next notch comes around, to close the clutch and lock the parts in the new position. When the rack-slide rises, the upper incline unclutches the parts again, allowing the type-wheel to go back to its normal position.

When the type-writer is operated, the throw of each cam $c^2$ or $c^3$ of each lever will give the proper extent of movement to the type-wheel; but to prevent the momentum of the wheel from carrying it too far I provide a stop mechanism, as follows: One side of the plate C⁸ is recessed and provided with a series of notches, one or the other of which is made to strike an abutment formed by the hooked end S⁶ of a lever S⁴. (See Fig. 14.) This lever is connected by a link S³ to the horizontal arm S² of a rocking frame S S', the other end of lever S⁴ being pivoted at S⁵ to a stationary part of the frame-work. The part S' of this rocking frame is held in vertical position and is acted upon by cams S⁷, which are arranged to give the same or a corresponding direction and extent of throw to this frame S S' S² that the other cams $c^2$ $c^3$ do to the type-wheel. The result is that the end S⁶ of lever S⁴ is raised or lowered more or less and forms an abutment that is struck by one or the other of the notches of plate C⁸, allowing the latter greater or less throw to correspond with the position of any particular letter of the type-wheel.

In the drawings I have shown these shifting and stop devices on the right-hand side of the machine; but for some reasons I prefer to place them on the left-hand side.

Having thus described my invention, what I claim as new is—

1. A type-writer adapted to printing upon books, consisting of a table provided with legs and elevated to receive the book beneath, one or more supporting-bars A⁶ for the book, having clamps attached for holding the book to the lower side of the table, with the leaf on top of the same, guide-bars arranged at the sides of the table, and a type-printing device sustained upon said guide-bars, the said guide-bars and printing device being pivoted or hinged at one end and provided with locking devices at the other, whereby the printing devices may be raised from the page being printed, substantially as shown and described.

2. The combination of the table A, the rock-shaft A', with upwardly-extending arms A² A², guide-bars A³ A³, attached thereto above the level of the table, the transverse rod A⁴, connecting the opposite ends of the guide-bars, spring-catches A⁹ A⁹, and the printing devices provided with guide-eyes and sliding upon the guide-bars, substantially as shown and described.

3. A type-writer having an oscillating type-wheel arranged in a vertical plane and combined with an actuating-shaft and having with said shaft a rigid rotary but longitudinally-adjustable connection, as described, whereby the type-wheel is guided to travel laterally across the page, and a set of key-levers and connecting mechanism for imparting oscillation to said shaft, substantially as shown and described.

4. A type-wheel having a circular series of type upon its periphery mounted upon shanks disposed at right angles to the plane of the wheel, with the printing-blocks at the ends of said shanks arranged in two rows upon alternately long and short shanks, substantially as shown and described.

5. The combination, with a type-wheel having on its periphery type with shanks arranged at right angles to the plane of the wheel, of a detent engaging with the shanks of said type as with teeth to hold the type-wheel stationary during the printing action, substantially as shown and described.

6. A type-wheel B, having grooved flanges $b$ $b$, with slits across the periphery parallel to the axis, in combination with the type-bars $b'$, with notches $b^2$ in one edge, the pivotal retaining-wire $b^4$, passing through the notches of all the type, and the elastic band $b^5$, passing around the wheel and retaining all the type in a yielding manner, substantially as shown and described.

7. A type for a type-writer, consisting of a metal shank notched at one end and having a type-block of hard rubber vulcanized upon this notched end of the shank, substantially as shown and described.

8. The combination, with the type-wheel and its supporting rock-shaft connected thereto by a feather or sliding connection, of a series of depressible key-levers, each having a cam or incline of different throw from the rest, a rocking frame pivoted at its lower side and arranged parallel to the rock-shaft and at one side of the same to be struck by the cams above, and arms and a connecting-rod for connecting the rocking frame with the rock-shaft of the type-wheel, substantially as shown and described.

9. The combination, with the rock-shaft of the type-wheel and the connecting-rod for transmitting the impulse of the keys thereto, of a pair of crossed links pivoted at one end to the connecting-rod and at the other end to a plate on the rock-shaft, substantially as shown and described.

10. The combination, with the type-wheel and its supporting rock-shaft having a sliding connection, as described, of two series of depressible key-levers, one series having cams of different inclinations facing in one direction and the other series having cams of different inclinations facing in the opposite direction, a rocking frame arranged parallel to the rock-shaft and at one side thereof and pivoted at its lower side and sustained in an intermediate position by springs and adapted to be thrown in one direction by one set of cams and in the opposite direction by the other set of cams, and arms and connecting-rod for transmitting this movement to the type-wheel shaft to throw it in one direction for one set of letters and in the opposite direction for another set, substantially as shown and described.

11. The combination, with the laterally-adjustable type-wheel arranged in a vertical plane and having laterally-projecting type, as described, of a tappet-lever mounted upon the type-wheel carriage and made laterally adjustable with it, having one end arranged within the circle of type, the depressible type-levers, and a bail or bar arranged beneath the type-levers and operating upon the tappet-lever, substantially as shown and described.

12. The combination, with the type-wheel having laterally-projecting type, as described, of a tappet lever having one end arranged within the circle of type, a locking-detent arranged with its tooth outside the circle of type, the depressible type-levers, and a bail or bar arranged beneath the type-levers and operating upon the tappet-lever and detent, substantially as shown and described.

13. The combination, with the type-wheel having two rows of type projecting laterally from the plane of the wheel, of a rock-shaft carrying and oscillating the said wheel, a grooved rock-shaft supporting a carriage for moving the wheel laterally, a bail E, arms E' E³, and link-bar E² for rocking the grooved shaft from the depression of the levers, collar E⁴, having pin $e$ playing in the groove of its shaft, and pin $e^2$, and the lever E⁵, having an oblique slot at one end receiving pin $e^2$ and having its other end swiveling in a groove of the hub of the type-wheel for shifting it laterally, substantially as shown and described.

14. The combination, with the type-wheel and its supporting-shaft, of a carriage carrying the type-wheel, a carriage-supporting shaft, and an endless chain connected with the carriage, and mechanism for imparting a step-by-step motion to the chain from the depression of the keys, substantially as shown and described.

15. The combination, with the supporting and actuating rock-shaft for the type-wheel, the type-wheel, its carriage, and the lateral feed mechanism for the same, of a tension-band attached thereto at one end and to a spring-winding drum at the other to make a quick and sensitive feed, substantially as shown and described.

16. The combination, with the actuating-shaft B², of the type-wheel B, mounted thereon in vertical position, as described, and provided with a laterally-adjustable carriage, the endless feed-chain G⁸, attached to the carriage, and a step-by-step adjusting mechanism for the chain, substantially as shown and described.

17. The combination, with the type-wheel, its carriage, and the endless chain, of the two chain-wheels G⁶, the shaft G⁵, having tight wheel $g^4$, the loose ratchet-wheel G⁴, with intermediate pawl $g^5$, the arm G', with actuating-pawl G² and detent G³, and the bail operated upon by the key-levers and acting upon the pawl G², substantially as shown and described.

18. The combination, with guide-bars A³, having notches or teeth upon their under sides, of a printing device sustained upon these guide-bars, a rock-shaft H², journaled in the printing device and provided with arms H³ and pawls H², and the crank H', and key H for feeding the type-writer down the page, substantially as shown and described.

19. The type-wheel-shifting devices consisting of a shaft having a feather-and-groove connection with the type-wheel and a toothed wheel, in combination with two rack-bars arranged upon opposite sides of the toothed wheel and clutching and unclutching devices, substantially as shown and described.

20. The combination of the type-wheel shaft having rigid gear-wheel I², the vertically-sliding racks I³ I³, a loose sleeve arranged upon the type-wheel shaft and connected to the mechanism for oscillating the shaft, and a clutch mechanism connecting the loose sleeve to the gear-wheel, the said clutch being arranged to be opened by the slide movement of the racks, substantially as shown and described.

21. The stop devices for limiting the throw of the type-wheel, consisting of the notched actuating-plate C⁸, combined with a movable abutment S⁶, the key-levers with cams, and a rocking frame operated upon by said cams to determine the position of said abutment, substantially as shown and described.

DANIEL C. WAY.

Witnesses:
CHAS. A. MUNN,
E. J. CLEMENTS.